United States Patent [19]

Tsuge et al.

[11] Patent Number: 5,227,451
[45] Date of Patent: Jul. 13, 1993

[54] URETHANE PREPOLYMER AND POLYURETHANE COMPOSITIONS COMPRISING THE PREPOLYMER

[75] Inventors: Yukio Tsuge, Ebina; Hisaharu Hotta, Yokohama; Haluo Iizuka, Atsugi, all of Japan

[73] Assignee: Mitsubishi Kasei Corporation, Tokyo, Japan

[21] Appl. No.: 778,083
[22] PCT Filed: Apr. 11, 1990
[86] PCT No.: PCT/JP90/00485
§ 371 Date: Apr. 7, 1992
§ 102(e) Date: Apr. 7, 1992
[87] PCT Pub. No.: WO91/15531
PCT Pub. Date: Oct. 17, 1991
[51] Int. Cl.$^5$ .................................................. C08G 18/10
[52] U.S. Cl. ........................................ 528/59; 528/60; 528/65
[58] Field of Search ............................ 528/59, 60, 65
[56] References Cited

U.S. PATENT DOCUMENTS 3,049,513  8/1962  Damusis et al. .................... 260/77.5
3,846,347  11/1974  Satterly .............................. 260/2.5

FOREIGN PATENT DOCUMENTS 2711735  9/1977  Fed. Rep. of Germany .
58-120627  7/1983  Japan .
1-411119  1/1989  Japan .
947483  1/1964  United Kingdom .

OTHER PUBLICATIONS

Chemical Abstracts, AN 82787W, vol. 114, No. 10, Mar. 1991, p. 17, & JP-A-02206612, Tsushimo, et al., "Manufacture of Isocyanate-Terminated Urethane Prepolymers".

World Patents Index Latest, Derwent Publications, Ltd., AN 90-294054, & JP-A-02 206 612, Aug. 16, 1990, "Urethane Prepolymers Prodn.—By Reacting Propylene Oxide and Ethylene Oxide With Mesoerythritol—And Relating Prod. With Di:Isocyanate".

Primary Examiner—Maurice J. Welsh
Attorney, Agent, or Firm—Oblon, Spivak, McClelland, Maier & Neustadt

[57] ABSTRACT

A urethane prepolymer useful for preparing paints, coating agents, adhesives, etc., is obtained by reacting a di-isocyanate with a tetra-functional polyol prepared by reacting erythritol with an alkylene oxide or lactone.

6 Claims, No Drawings

URETHANE PREPOLYMER AND POLYURETHANE COMPOSITIONS COMPRISING THE PREPOLYMER

This invention relates to a urethane prepolymer used for preparing a paint, coating agent, adhesive, or the like, and also to a polyurethane composition prepared by using such a prepolymer, in particular a paint, a coating agent or an adhesive.

A two-pack urethane paint, coating agent, or adhesive is a two-component system comprising a urethane prepolymer having isocyanate groups, and a polyol. There are known two major classes of urethane prepolymers having isocyanate groups, i.e. (1) adducts obtained by reacting polyhydric alcohols such as trimethylolpropane, or water with di-isocyanates, and (2) isocyanurates obtained by the cyclic trimerization of di-isocyanates by catalysts. These urethane prepolymers generally contain not more than three isocyanate groups in a molecule on average. The urethane prepolymers give polyurethane compositions if mixed with polyols, etc. The polyurethane compositions are hardened by urethane reaction (crosslinking) to exhibit such physical properties as desired. There is a need for polyurethane compositions which can be hardened at a higher rate and exhibit better physical properties when hardened.

Processes including preparing multifunctional urethane prepolymers are known as one of the approaches to the manufacture of polyurethane compositions giving excellent physical properties when hardened. It has, for example, been proposed that pentaerythritol containing four functional groups, dipentaerythritol containing six functional groups, or sucrose containing eight functional groups be used as the polyhydric alcohol feedstock, and be reacted directly with a di-isocyanate to prepare a urethane prepolymer containing four to eight isocyanate groups per molecule. These polyhydric alcohols have, however, been difficult to react uniformly with di-isocyanates, since their compatibility with di-isocyanates is low and their melting points are high. Therefore, attempts have been made to react di-isocyanates with polyols prepared by the addition reaction of polyhydric alcohols with alkylene oxides to improve the compatibility of polyhydric alcohols with di-isocyanates. The polyhydric alcohols have, however, been difficult to react directly with alkylene oxides, since they have high melting points and have low solubility. It has, therefore, been usual practice to use alkylene oxides diluted with glycerol, water, or the like. It has been possible, however, to obtain only an adduct of low purity and it has been difficult to prepare satisfactory urethane prepolymers, since the reaction of di-isocyanates with any such adduct has resulted in the formation of a gel, or a product having too few functional groups.

U.S. Pat. Nos. 2,778,885; and 3,291,865 and Japanese Patent Application Laid-Open No. 51-93995 disclose processes for manufacturing polyols by reacting erythritol with epoxy compounds, such as alkylene oxides. U.S. Pat. No. 2,778,855, however, describes only a process for manufacturing polyols and does not contain any disclosure of the specific use of these polyols. U.S. Pat. No. 3,291,865 does suggest the application of polyols to the manufacture of polyurethanes, etc., but does not describe any specific example of such an application. Japanese Patent Application Laid Open No. 51-93995 describes a process for manufacturing urethane foams from polyols directly in a single step, but does not disclose any process for reacting polyols with di-isocyanates to prepare urethane prepolymers. It does not teach any use of polyols for purposes other than the manufacture of foams, either.

There is known a polyether polyol prepared by adding propylene oxide to ethylenediamine and containing four functional groups. This polyol, however, is likely to form a gel as a result of a side reaction during the synthesis of a prepolymer, since it contains tertiary nitrogen. The polyurethane composition manufactured using this polyol is easily degraded by oxidation, is undesirably colored, and is unstable to heat.

Other possible polyhydric alcohols include condensation polyester polyols having low molecular weight, and acrylic polyols produced by the polymerization of acrylic monomers and having low molecular weight. The mechanism of the reaction which is involved, however, makes it difficult always to produce any polyhydric alcohol of this type containing four or five hydroxyl groups in a molecule.

It is an object of this invention to provide a urethane prepolymer which can be hardened rapidly and yield a hardened product having excellent properties, and a polyurethane composition comprising such a urethane prepolymer and a polyol, particularly a two-pack composition used as, for example, a paint, a coating agent or an adhesive.

This object is attained by a urethane prepolymer containing isocyanate groups which is obtained by reacting erythritol with 2 to 8 mols of an alkylene oxide or lactone per mol of erythritol to prepare a polyol containing four functional groups, and by reacting the polyol with a di-isocyanate in a reaction equivalent ratio (isocyanate groups/hydroxyl groups) of 3–20, and by a polyurethane composition which is prepared from any such prepolymer and a polyol.

The urethane prepolymer of this invention is a prepolymer containing isocyanate groups and obtained by reacting erythritol with 2 to 8 mols of an alkylene oxide or lactone per mol of erythritol to prepare a polyol containing four functional groups, and by reacting the polyol with a di-isocyanate in a reaction equivalent ratio (isocyanate groups/hydroxyl groups) of 3–20.

The polyurethane composition of this invention is a composition comprising any urethane prepolymer of this invention and a polyol.

The erythritol which is used for the purpose of this invention is a tetrose alcohol having a molecular weight of 122 and the empirical formula $C_4H_{10}O_4$. There are three isomers: D-erythritol, L-erythritol and mesoerythritol. Mesoerythritol, which has the structural formula

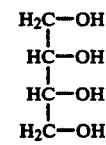

and a melting point of 121.5° C., can be manufactured at a low cost by a variety of methods such as the breakdown of glucose or n-paraffin by fermentation, the reduction of tartaric acid, and a process which comprises oxidizing cellulose or starch with periodic acid, hydrogenation and hydrolysis.

D-erythritol and L-erythritol, neither of which occurs naturally, can both be synthesized by, for example, reducing erythrose. They both have a melting point of 88° C. and can be used like mesoerythritol. A mixture of the D- and L-forms (racemic form) can also be used.

The melting points of erythritol are lower than those of other multifunctional polyols, e.g. pentaerythritol (m.p. over 180° C.) and sucrose (m.p. 187° C.). Erythritol has good solubility in alkylene oxides and lactones. The addition reaction between erythritol and any alkylene oxide or lactone, therefore, does not call for the addition of any solvent, such as glycerol or water, or the use of a temperature that is so high as to be likely to cause an explosion. A polyol of high purity containing four functional groups can be synthesized easily by reaction at a temperature which is as low as, say, between 100° C. and 180° C. If the polyol is reacted with a di-isocyanate, a desired multifunctional prepolymer containing isocyanate groups can be obtained easily without undergoing any gelatinization.

Ethylene oxide, propylene oxide, 1,2-butylene oxide and 2,3-butylene oxide are examples of the alkylene oxides which can be used for reaction with erythritol in accordance with this invention. Ethylene or propylene oxide is preferably used.

An average of 2 to 8 mols of alkylene oxide is preferably reacted with 1 mol of erythritol. The use of the alkylene oxide in a proportion below 2 mols gives a polyol having low compatibility with the di-isocyanate, and results in failure to produce a uniform urethane prepolymer. The use of alkylene oxide in a proportion above 8 mols is also undesirable, as it results in the formation of a urethane prepolymer having too low an isocyanate content.

The addition reaction between erythritol and alkylene oxide can be performed by any known method employing, for example, an acid or alkali catalyst.

The lactone which can be used for reaction with the erythritol in accordance with this invention is a compound containing a five- or more-membered ring, i.e. one having four or more carbon atoms in the ring. Specific examples are $\epsilon$-caprolactone, $\gamma$-methyl-$\delta$-valerolactone, $\delta$-valerolactone and $\gamma$-butyrolactone. $\epsilon$-Caprolactone is, among others, preferred.

An average of 2 to 8 mols of lactone is preferably reacted with 1 mol of erythritol. The use of the lactone in a proportion below 2 mols gives a polyol having low compatibility with the di-isocyanate, and results in failure to produce a uniform urethane prepolymer. The use of the lactone in any proportion above 8 mols is also undesirable, as it results in the formation of a urethane prepolymer having too low an isocyanate content.

Any method that is itself known in the art can be employed for causing the addition reaction between the erythritol and the lactone. The reaction can, for example, be easily accomplished if the mixture of reactants is heated to a temperature of 100° C. to 220° C. with stirring in the presence or absence of a catalyst comprising an organic titanium compound such as tetrabutyl titanate, an organic tin compound such as dibutyltin dilaurate, or a metal such as sodium or potassium.

Examples of the di-isocyanate to be reacted with the polyol containing four functional groups which is obtained as the product of the addition reaction between erythritol and alkylene oxide or lactone, include 2,4-tolylene diisocyanate, 2,6-tolylene diisocyanate, 4,4'-diphenylmethane diisocyanate, naphthalene-1,5-diisocyanate, xylylene diisocyanate, isophorone diisocyanate, hexamethylene diisocyanate, and 4,4'-methylenebiscyclohexyl isocyanate.

The reaction between the polyol and the diisocyanate is preferably carried out in a mixture thereof having an equivalent ratio of isocyanate/hydroxyl groups ranging between 3 and 20. If the ratio is below 3 the reaction is likely to yield a urethane prepolymer having a high molecular weight, or even a gelated product. If the ratio is over 20 a large amount of diisocyanate remains unreacted and its removal is very difficult.

The other conditions for the urethane reaction depend on the polyol and diisocyanate which are employed. For example, it is possible to use a solvent which is unreactive with the isocyanate group, such as methyl ethyl ketone, ethyl acetate, methyl isobutyl ketone or acetone, or alternatively, no solvent is used. The reaction temperature may be selected from the range of 0° C. to 100° C. If required, it is possible to use a catalyst which is usually employed for urethanation, such as dibutyltin dilaurate, dibutyltin octoate, N-ethylmorpholine or triethylenediamine.

After the urethane reaction has finished the unreacted diisocyanate monomer is removed from the reaction product by, for example, thin-film distillation or solvent extraction. It is desirable that the urethane prepolymer does not contain more than 1% by weight of diisocyanate monomer, as its vapor is toxic. It is, however, necessary to perform distillation, etc. under strictly controlled conditions, since the urethane prepolymer is likely to undergo reaction to a high molecular substance, such as allophanation, upon exposure to a high temperature.

Examples of the polyol which is used with the urethane prepolymer to form the polyurethane composition of this invention include polyester polyols, polyether polyols, oil-modified polyester polyols, acrylic polyols and urethane elastomers containing hydroxyl groups.

The polyurethane composition of this invention may further comprise a polyamine. Examples of the polyamines which can be used include polyethylene polyamines, polypropylene polyamines, and polyamides which are obtained by reacting polymerized fatty acids and polyamines.

The polyurethane composition of this invention comprises a mixture of urethane prepolymer and polyol giving an equivalent ratio of isocyanate/hydroxyl groups (which may hereinafter be stated as (NCO/OH)) ranging between 0.5 and 2.0. If the ratio is below 0.5 the composition fails to be satisfactorily crosslinked and yields a hardened product which is low in hardness, and chemical and solvent resistance. If the ratio is over 2.0, the composition yields a hardened product which is brittle and of low impact resistance.

The polyurethane composition of this invention is usually supplied as a two-pack composition, i.e., the urethane prepolymer and the polyol are mixed to form the composition immediately prior to its use.

The polyurethane composition of this invention is usually diluted with a solvent, etc. when it is used, though it can also be used without being diluted, or in a solventless form. For diluting the composition it is possible to use a solvent which is unreactive with the isocyanate group, for example, ethyl or butyl acetate, acetone, methyl ethyl ketone, xylene, dioxan or Cellosolve acetate. It is also possible to use as the diluent a plasticizer such as dibutyl phthalate or octoate.

The composition may further contain a catalyst for promoting its hardening, if required. It is possible to use as the catalyst, for example, an organic metal compound such as dibutyltin dilaurate, dibutyltin dioctoate, tetrabutyl-1,3-diacetoxy-distannoxan, stannous octoate, lead naphthenate or ferric acetylacetonate, or a tertiary amine such as triethylenediamine. If any such catalyst is used, its proportion is from 0.01 to 3% by weight of the prepolymer.

It is also possible to add to the polyurethane composition of this invention any of various pigments including azo pigments, copper phthalocyanine pigments, other organic and inorganic color pigments such as red oxide, chrome yellow, titanium dioxide, zinc white and carbon black, rust-preventing pigments such as minimum, lead white, basic chromates, basic lead sulfate, zinc chromate and zinc dust, and extender pigments such as clays, silica, talc, calcium carbonate and micas, if required. It is also possible to add various kinds of agents including leveling agents and silane or titanium coupling agents, if required. It is further possible to add xylene, vinyl chloride, cellulosic, acrylic, and other resins to the extent that they do not adversely affect the physical properties of the composition.

The polyurethane composition of this invention is particularly suitable for use as a paint, coating agent, or adhesive. It can be used at normal temperatures or by heating to a temperature of 50° C. to 80° C. for application by, for example, spraying or roll coating onto a metal, a film, a molded product of plastics, cloth, etc. The film formed by the composition can be hardened if it is allowed to dry at room temperature, or heated to a temperature of 80° C. to 250° C.

The polyurethane composition of this invention can be hardened rapidly and yield a hardened product having a high crosslinking density and excellent physical properties including hardness, chemical and solvent resistance, and adhesiveness. Therefore, it provides an excellent paint, coating agent, or adhesive.

The invention will now be described more specifically with reference to examples relating to the synthesis of polyols and urethane prepolymers, examples of polyurethane compositions and comparative examples.

POLYOL SYNTHESIS EXAMPLE 1

The synthesis of a polyol was carried out by an addition reaction employing mesoerythritol and propylene oxide in a molar ratio of 1:4.

A reaction vessel was charged with 122.1 g of mesoerythritol, 232.2 g of propylene oxide and 10.6 g of potassium hydroxide and the mixture thereof was heated at 60° C. for an hour and at 110° C. for eight hours with stirring to undergo reaction. When the reaction had been completed dry nitrogen gas was blown into the reaction product to remove the unreacted propylene oxide and water which remained to some extent. Then, phosphoric acid was added to the reaction product to neutralize the potassium hydroxide and the alkali was completely removed by filtration, whereby a tetrafunctional polyol having a hydroxyl number of 633 and an acid value of 0.02 was obtained as the product of the addition reaction between mesoerythritol and propylene oxide.

POLYOL SYNTHESIS EXAMPLE 2

In this example, mesoerythritol and propylene oxide were employed in a molar ratio of 1:6 and the reaction vessel was charged with 122.1 g of mesoerythritol, 348.3 g of propylene oxide and 14.1 g of potassium hydroxide. Then, the reaction and treatment of Synthesis Example 1 were repeated to yield an adduct having a hydroxyl number of 477 and an acid value of 0.02.

POLYOL SYNTHESIS EXAMPLE 3

In this example, mesoerythritol and ethylene oxide were employed in a molar ratio of 1:2.5 and the reaction vessel was charged with 122.1 g of mesoerythritol, 110.0 g of ethylene oxide and 7.0 g of potassium hydroxide. Then, the reaction and treatment of Synthesis Example 1 were repeated to yield an adduct having a hydroxyl number of 967 and an acid value of 0.02.

POLYOL SYNTHESIS EXAMPLE 4

An addition reaction was caused to take place between mesoerythritol and caprolactone employed in a molar ratio of 1:2.5. The reaction vessel was charged with 122.1 g of mesoerythritol, 285.4 g of ε-caprolactone and 0.004 g of tetrabutyl titanate and they were reacted at 170° C. for 10 hours with stirring to yield an adduct between mesoerythritol and caprolactone (tetrafunctional polyol) having a hydroxyl number of 551 and an acid value of 0.4.

POLYOL SYNTHESIS EXAMPLE 5

In this example, mesoerythritol and caprolactone were employed in a molar ratio of 1:6 and the reaction vessel was charged with 122.1 g of mesoerythritol, 684.8 g of ε-caprolactone and 0.01 g of tetrabutyl titanate. Then, the reaction of Synthesis Example 4 was repeated to yield an adduct having a hydroxyl number of 278 and an acid value of 0.3.

POLYOL SYNTHESIS EXAMPLE 6

In this example, mesoerythritol and propylene oxide were employed in a molar ratio of 1:1.5 and the reaction vessel was charged with 122.1 g of mesoerythritol, 87.1 g of propylene oxide and 6.3 g of potassium hydroxide. Then, the reaction and treatment of Synthesis Example 1 were repeated to yield an adduct having a hydroxyl number of 1072 and an acid value of 0.03.

POLYOL SYNTHESIS EXAMPLE 7

In this example, mesoerythritol and propylene oxide were employed in a molar ratio of 1:9. The reaction vessel was charged with 122.1 g of mesoerythritol, 522.5 g of propylene oxide and 19 g of potassium hydroxide and the reaction and treatment of Synthesis Example 1 were repeated to yield an adduct having a hydroxyl number of 348 and an acid value of 0.02.

URETHANE PREPOLYMER SYNTHESIS EXAMPLE 1

A reaction vessel was charged with 1740 g of raw diisocyanate consisting of 2,4-tolylene diisocyanate and 2,6-tolylene diisocyanate mixed in a weight ratio of 80/20 (hereinafter referred to as "80-TDI") and 354 g of polyol which had been obtained in Polyol Synthesis Example 1 and they were reacted by heating at 55° C. for eight hours with stirring. The (NCO/OH) value was 5.

The solution obtained as the reaction product was subjected to thin-film distillation at a temperature of 165° C. and a pressure of 1 mm Hg, whereby the unreacted tolylene diisocyanate monomers were removed and a urethane prepolymer was obtained. The urethane prepolymer was dissolved in ethyl acetate to form a urethane prepolymer solution having a concentration of 70% by weight. The urethane prepolymer solution was found to contain 10.1% by weight of NCO and 0.3% by weight of unreacted tolylene diisocyanate monomer.

The conditions employed for the preparation of the prepolymer and the characteristics of its solution are shown in TABLE 1.

URETHANE PREPOLYMER SYNTHESIS EXAMPLES 2 TO 4

Synthesis Example 1 was followed to prepare urethane prepolymer solutions, except that the conditions were altered as shown in TABLE 1. The (NCO/OH) value was 5 in all of the examples. The characteristics of the solutions are shown in TABLE 1.

URETHANE PREPOLYMER SYNTHESIS EXAMPLE 5

1740 g of 80-TDI and 408 g of polyol which had been obtained in Polyol Synthesis Example 4 were reacted at 55° C. for eight hours. The (NCO/OH) value was 5.

The solution obtained as the reaction product was subjected to thin-film distillation at a temperature of 165° C. and a pressure of 1 mm Hg, whereby the unreacted tolylene diisocyanate monomers were removed and a urethane prepolymer was obtained. The prepolymer was dissolved in ethyl acetate to form a urethane prepolymer solution having a concentration of 70% by weight. The solution was found to contain 9.5% by weight of NCO and 0.3% by weight of unreacted tolylene diisocyanate monomer.

The conditions employed for the preparation of the prepolymer and the characteristics of its solution are shown in TABLE 2.

URETHANE PREPOLYMER SYNTHESIS EXAMPLES 6 TO 8

Synthesis Example 5 was followed to prepare urethane prepolymer solutions, except that the conditions were altered as shown in TABLE 2. The (NCO/OH) value was 5 in all of the examples. The characteristics of the solutions are shown in TABLE 2.

URETHANE PREPOLYMER SYNTHESIS EXAMPLE 9

An attempt was made to react at 55° C. 870 g of 80-TDI and 354.3 g of polyol which had been obtained in Polyol Synthesis Example 1, but a gel was formed before the reaction was complete. This was apparently due to the fact that the (NCO/OH) value was as low as 2.5.

URETHANE PREPOLYMER SYNTHESIS EXAMPLE 10

730.8 g of 80-TDI and 35.4 g of the polyol which had been obtained in Polyol Synthesis Example 1 were reacted at 55° C. for eight hours. The (NCO/OH) value was 21. The reaction product was a solution consisting of 15% by weight of urethane prepolymer and as much as 85% by weight of 80-TDI. The removal of the unreacted TDI monomers took a great deal of time.

URETHANE PREPOLYMER SYNTHESIS EXAMPLE 11

The reaction vessel was charged with 1740 g of 80-TDI and 209.2 g of polyol which had been obtained in Polyol Synthesis Example 6. Although an attempt was made to react them at 55° C., no uniform reaction took place, but a turbid solution was formed. When the stirring of the solution was discontinued solid matter settled as a gel which was insoluble in ethyl acetate. The (NCO/OH) value was 5.

URETHANE PREPOLYMER SYNTHESIS EXAMPLE 12

The reaction vessel was charged with 1740 g of 80-TDI and 645 g of polyol which had been obtained in Polyol Synthesis Example 7, and they were reacted at 55° C. for eight hours. The (NCO/OH) value was 5.

The solution obtained as the reaction product was subjected to thin-film distillation at 165° C. and 1 mm Hg, whereby the unreacted TDI monomers were removed and a urethane prepolymer was obtained. The prepolymer was dissolved in ethyl acetate to form a urethane prepolymer solution having a concentration of 70% by weight. The solution was found to contain 7.7% by weight of NCO and 0.6% by weight of unreacted monomer.

TABLE 1

| | | | Examples of Urethane Prepolymers | | | |
|---|---|---|---|---|---|---|
| | | | 1 | 2 | 3 | 4 |
| Conditions for preparation of urethane prepolymers | Amounts for materials used for reaction (g) | 80-TDI | 1740 | 1740 | — | — |
| | | Isophorone diisocyanate | — | — | 2223 | 2223 |
| | | Polyol obtained in Synthesis Example 1 | 354 | — | — | 354 |
| | | Polyol obtained in Synthesis Example 2 | — | — | 470 | — |
| | | Polyol obtained in Synthesis Example 3 | — | 232 | — | — |
| | | Polyol obtained in Synthesis Example 4 | — | — | — | — |
| | | Polyol obtained in Synthesis Example 5 | — | — | — | — |
| | | Catalyst (dibutyltin dilaurate) | — | — | 0.6 | 0.6 |
| | Other conditions | Reaction temp. (°C.) | 55 | 55 | 70 | 70 |
| | | Reaction time (hr) | 8 | 8 | 5 | 5 |
| | | Temp. of thin-film distillation tube (°C.) | 165 | 165 | 180 | 180 |
| | | Vacuum degree of thin-film distillation tube (mmHg) | 1 | 1 | 0.5 | 0.5 |
| Characteristics of urethane prepolymer solution obtained | | Concentration (wt. % in ethyl acetate) | 70 | 70 | 70 | 70 |
| | | Appearance | Light yellow transparent | Light yellow transparent | Light yellow transparent | Light yellow transparent |
| | | Diisocyanate monomer content (wt. %) | 0.3 | 0.3 | 0.4 | 0.3 |
| | | NCO content (wt. %) | 10.1 | 11.5 | 7.6 | 8.4 |

TABLE 2

| | | | Examples of Urethane Prepolymers | | | |
|---|---|---|---|---|---|---|
| | | | 5 | 6 | 7 | 8 |
| Conditions for preparation of urethane prepolymers | Amounts for materials used for reaction (g) | 80-TDI | 1740 | 1740 | — | — |
| | | Isophorone diisocyanate | — | — | 2223 | 2223 |
| | | Polyol obtained in Synthesis Example 1 | — | — | — | — |
| | | Polyol obtained in Synthesis Example 2 | — | — | — | — |
| | | Polyol obtained in Synthesis Example 3 | — | — | — | — |
| | | Polyol obtained in Synthesis Example 4 | 408 | — | 408 | — |
| | | Polyol obtained in Synthesis Example 5 | — | 807 | — | 807 |
| | | Catalyst (dibutyltin dilaurate) | — | — | 0.6 | 0.6 |
| | Other conditions | Reaction temp. (°C.) | 55 | 55 | 70 | 70 |
| | | Reaction time (hr) | 8 | 8 | 5 | 5 |
| | | Temp. of thin-film distillation tube (°C.) | 165 | 165 | 180 | 180 |
| | | Vacuum degree of thin-film distillation tube (mmHg) | 1 | 1 | 0.5 | 0.5 |
| Characteristics of urethane prepolymer solution obtained | | Concentration (wt. % in ethyl acetate) | 70 | 70 | 70 | 70 |
| | | Appearance | Light yellow transparent | Light yellow transparent | Light yellow transparent | Light yellow transparent |
| | | Diisocyanate monomer content (wt. %) | 0.3 | 0.4 | 0.4 | 0.4 |
| | | NCO content (wt. %) | 9.5 | 6.8 | 8.0 | 6.0 |

Polyurethane Composition Examples 1 to 9 and Comparative Examples 1 to 4

All of these examples were directed to polyurethane compositions intended for use as paints.

Paint compositions were prepared by mixing the urethane prepolymers which had been obtained in Urethane Prepolymer Synthesis Examples 1 to 8, a urethane prepolymer commercially available in the name of GP105A (product of Mitsubishi Kasel Corporation made as an adduct between tolylene diisocyanate and trimethylolpropane and having an NCO content of 13.2% by weight and a concentration of 75% by weight) or another urethane prepolymer commercially available in the name of NY215A (product of the same Japanese company made as an adduct between isophorone diisocyanate and trimethylolpropane and having an NCO content of 10.2% by weight and a concentration of 75% by weight) with an acrylic polyol commercially available in the name of Acrydic A-801 (product of Dainippon Ink & Chemicals Inc. having a hydroxyl number of 50 and a concentration of 50% by weight), a polyester polyol commercially available in the name of Desmophen 1100 (product of Bayer AG having a hydroxyl number of 210) or another polyester polyol commercially available in the name of Desmophen 800 (product of Bayer AG having a hydroxyl number of 290), as shown in TABLES 3 to 6 below.

Each composition was evaluated for the hardening rate of a film thereof and for the physical properties of the hardened film. The results are shown in TABLES 3 to 6. The evaluation was made in accordance with the methods which will hereunder be described.

(1) Preparation of paint:

In each example, the urethane prepolymer and the polyol were mixed in proportions making a mixture having an NCO/OH value (equivalent ratio) of 1.

(2) Dilution:

The mixed urethane prepolymer and polyol solution was diluted to a concentration of about 30% by weight with a mixed solvent prepared by mixing xylene, n-butyl acetate, ethyl acetate and Cellosolve acetate in a weight ratio of 3:3:3:1.

(3) Application:

The diluted solution was applied by air spraying to coat a panel.

(4) Panel coated:

The panel was of a bright Bt #144 treated steel sheet and measured 0.6 mm by 70 mm by 150 mm.

(5) Evaluation of a coated film prior to its hardening:

Hardening and drying time:

The film was held at 20° C. and the gauze which had been soaked with ethyl acetate was rubbed against the film five times to see if the film would peel off. It no longer peeled off if it had already hardened and dried.

Tack-free time:

The film was examined for tackiness by a finger.

(6) Evaluation of the film as hardened:

The film was hardened by heating at a temperature of 80° C. for 40 minutes and was, then, evaluated for its physical properties, as will hereinafter be described.

Pencil hardness:

This property was examined in accordance with the JIS-5400 method.

Du Pont impac resistance:

This property was examined in accordance with the JIS-5400 method using a striking die of 0.5 inch diameter and a weight of 500 g. The result is shown by the maximum height from which impact could be applied to the film without damaging it.

Adhesiveness:

This property was examined in accordance with the JIS-5400 method.

Solvent resistance:

The gauze which had been soaked with ethyl acetate was rubbed against the film 20 times and the film portions which had not been affected were compared in area with the original film. The unaffected or remaining film, or film portions were also inspected visually. The results are shown by % and also by the following symbols:

○—The whole film remained unaffected by the solvent, and unchanged in luster;

△—The greater part of the film remained unaffected, but was lower in luster;

x—The greater part of the film was dissolved by the solvent.

Acid resistance:

The coated plate was dipped in a 5% aqueous solution of hydrogen chloride at 25° C. After 48 hours, the film portions which had not been affected were compared in area with the original film. The unaffected or remaining film, or film portions were also inspected visually. The results are shown by % and also by the following symbols:

○—The whole film remained unaffected by the acid, and unchanged in luster;
Δ—The greater part of the film remained unaffected, but was lower in luster;
x—The greater part of the film was dissolved in the solution.

Alkali resistance:

The coated plate was dipped in a 5% aqueous solution of sodium hydroxide at 25° C. After 48 hours, the film portions which had not been affected were compared in area with the original film. The unaffected or remaining film, or film portions were also inspected visually. The results are shown by % and also by the following symbols:

○—The whole film remained unaffected by the alkali, and unchanged in luster;
Δ—The greater part of the film remained unaffected, but was lower in luster;
x—The greater part of the film was dissolved in the solution.

TABLE 3

| | | Examples of compositions | | | |
|---|---|---|---|---|---|
| | | 1 | 2 | 3 | 4 |
| Formulation | Urethane prepolymer | Snythesis Example 1 | Snythesis Example 2 | Snythesis Example 3 | Snythesis Example 4 |
| | Polyol | A-801*1 | A-801*1 | A-801*1 | A-801*1 |
| | Amount of dibutyltin dilaurate (ppm) | 0 | 0 | 500 | 500 |
| Hardenability | Tack-free time (20° C.) | 12 min. | 10 min. | 15 min. | 12 min. |
| | Hardening and drying time (20°C.) | 3 hours | 3 hours | 4 hours | 3.5 hours |
| Physical properties of film as hardened | Pencil hardness | 4H | 5H | 3H | 4H |
| | Adhesion (crosscut test) | 100/100 | 100/100 | 100/100 | 100/100 |
| | Du Pont impact resistance test | 50 cm | 50 cm | 50 cm | 50 cm |
| | Solvent resistance*2 (ethyl acetate) | ○ (100) | ○ (100) | ○ (100) | ○ (100) |
| | Alkali resistance (5% NaOH)*2 | ○ (100) | ○ (100) | Δ (100) | ○ (100) |
| | Acid resistance (5% HCl)*2 | ○ (100) | ○ (100) | ○ (100) | ○ (100) |

Notes:
*1Acrylic A-801 - tradename of Dainippon Ink & Chemicals Inc.
*2Each figure in the parentheses represents % of the area of the film found remaining after the test.

TABLE 4

| | | Examples of compositions | | |
|---|---|---|---|---|
| | | 5 | 6 | 7 |
| Formulation | Urethane prepolymer | Synthesis Example 5 | Synthesis Example 6 | Synthesis Example 7 |
| | Polyol | A-801*1 | A-801*1 | A-801*1 |
| | Amount of dibutyltin dilaurate (ppm) | 0 | 0 | 500 |
| Hardenability | Tack-free time (20° C.) | 10 min. | 12 min. | 12 min. |
| | Hardening and drying time (20°C.) | 3 hours | 3.5 hours | 3 hours |
| Physical properties of film as hardened | Pencil hardness | 4H | 4H | 5H |
| | Adhesion (crosscut test) | 100/100 | 100/100 | 100/100 |
| | Du Pont impact resistance test | 50 cm | 50 cm | 50 cm |
| | Solvent resistance*2 (ethyl acetate) | ○ (100) | ○ (100) | ○ (100) |
| | Alkali resistance (5% NaOH)*2 | ○ (100) | ○ (100) | ○ (100) |
| | Acid resistance (5% HCl)*2 | ○ (100) | ○ (100) | ○ (100) |

Notes:
*1Acrylic A-801 - tradename of Dainippon Ink & Chemicals Inc.
*2Each figure in the parentheses represents % of the area of the film found remaining after the test.

TABLE 5

| | | Examples of compositions | | |
|---|---|---|---|---|
| | | 8 | 9 | Comparative Example 1 |
| Formulation | Urethane prepolymer | Synthesis Example 8 | Synthesis Example 1 | GP 105A*3 |
| | Polyol | A-801*1 | D1100*5/ D800*6 = 1/1 | A-801*1 |
| | Amount of dibutyltin dilaurate (ppm) | 500 | 0 | 0 |
| Hardenability | Tack-free time (20° C.) | 15 min. | 12 min. | 20 min. |
| | Hardening and drying time (20°C.) | 4 hours | 2.5 hours | 5 hours |
| Physical properties of film as hardened | Pencil hardness | 4H | 3H | 2H |
| | Adhesion (crosscut test) | 100/100 | 100/100 | 90/100 |
| | Du Pont impact resistance test | 50 cm | 50 cm | 40 cm |
| | Solvent resistance*2 (ethyl acetate) | ○ (100) | ○ (100) | ○ (100) |
| | Alkali resistance (5% NaOH)*2 | Δ (90) | ○ (100) | Δ (90) |

TABLE 5-continued

|  | Examples of compositions | | |
|---|---|---|---|
|  | 8 | 9 | Comparative Example 1 |
| Acid resistance (5% HCl)[*2] | ○ (100) | ○ (100) | Δ (100) |

Notes:
[*1]Acrylic A-801 - tradename of Dainippon Ink & Chemicals Inc.
[*2]Each figure in the parentheses represents % of the area of the film found remaining after the test.
[*3]Tradename of Mitsubishi Kasei Corpoation
[*5]Desmophen 1100 (Tradename of BASF AG)
[*6]Desmophen 800 (Tradename of BASF AG)

TABLE 6

|  |  | Examples of compositions | | |
|---|---|---|---|---|
|  |  | Comparative Example 2 | Comparative Example 3 | Comparative Example 4 |
| Formulation | Urethane prepolymer | NY 215A[*4] | Synthesis Example 12 | GP 105A[*3] |
|  | Polyol | A-801[*1] | A-801[*1] | D1100[*5]/D800[*6] = 1/1 |
|  | Amount of dibutyltin dilaurate (ppm) | 500 | 0 | 0 |
| Hardenability | Tack-free time (20° C.) | 25 min. | 25 min. | 20 min. |
|  | Hardening and drying time (20°C.) | 7 hours | 6 hours | 4 hours |
| Physical properties of film as hardened | Pencil hardness | 3H | 2B | H |
|  | Adhesion (crosscut test) | 85/100 | 90/100 | 95/100 |
|  | Du Pont impact resistance test | 30 cm | 40 cm | 45 cm |
|  | Solvent resistance[*2] (ethyl acetate) | Δ (80) | Δ (90) | ○ (100) |
|  | Alkali resistance (5% NaOH)[*2] | X (30) | Δ (90) | Δ (80) |
|  | Acid resistance (5% HCl)[*2] | Δ (90) | Δ (100) | Δ (100) |

Notes:
[*1]Acrylic A-801 - tradename of Dainippon Ink & Chemicals Inc.
[*2]Each figure in the parentheses represents % of the area of the film found remaining after the test.
[*3]Tradename of Mitsubishi Kasei Corporation
[*4]Tradename of Mitsubishi Kasei Corporation
[*5]Desmophen 1100 (Tradename of BASF AG)
[*6]Desmophen 800 (Tradename of BASF AG)

POLYURETHANE COMPOSITION EXAMPLES 10 AND 11 AND COMPARATIVE EXAMPLE 5

All of these examples were directed to compositions intended for use as adhesives.

Urethane adhesive compositions were prepared by mixing the urethane prepolymer which had been obtained in Urethane Prepolymer Synthesis Example 1 or 5, or the commercially available urethane prepolymer, GP105A (product of Mitsubishi Kasei Corporation obtained as an adduct between tolylene diisocyanate and trimethylolpropane, and having an NCO content of 13.2% by weight and a concentration of 75% by weight) with a commercially available polyurethane resin containing hydroxyl groups as sold in the name of Nippolan 3022 (product of Nippon Polyurethane Industries supplied as an ethyl acetate solution having a solid content of 35% by weight), as shown in TABLE 7.

Each adhesive was evaluated for its adhesive strength by the method which will hereinafter be described. The results are shown in TABLE 7.

Method of Evaluation:
Materials bonded:
Polyethylene terephthalate films each having a thickness of 125 microns.

Application:
An ethyl acetate dilution of the adhesive having a resin content of 20% by weight was applied to coat one surface of each of two polyethylene terephthalate films. It was applied to give a dry resin coating weight of 15 g/m².

Pressing:
The coating was dried at 80° C. for five minutes, whereby the solvent was removed. Then, the coated surfaces were placed on each other and pressed against each other by application of a pressure of 1 to 3 kg/cm² at room temperature.

Hardening:
The coating was hardened by heating at 80° C. for two hours.

Determination of peel strength:
A specimen measuring 10 mm by 150 mm was cut from the films which had been bonded together and a T-peel test was conducted on it at a pull rate of 100 mm/min., a temperature of 23° C. and a relative humidity of 65%.

TABLE 7

|  |  | Examples of compositions | | |
|---|---|---|---|---|
|  |  | 10 | 11 | Comparative Example 5 |
| Formulation | Urethane prepolymer | Synthesis Example 1 | Synthesis Example 5 | GP 105A[*3] |
|  | Polyol | N 3022[*7] | N 3022[*7] | N 3022[*7] |
|  | Urethane prepolymer/polyol (solid weight ratio) | 1/10 | 1/10 | 1/10 |

TABLE 7-continued

| | Examples of compositions | | |
|---|---|---|---|
| | 10 | 11 | Comparative Example 5 |
| Adhesive (peel) strength (kg/cm) | 1.8 | 2.2 | 0.7 |

Notes:
*³See Note *³ to Table 5.
*⁷Tradename of Nippon Polyurethane Industries for polyurethane resin containing hydroxyl groups.

We claim:

1. A urethane prepolymer containing isocyanate groups which is obtained by reacting erythritol with 2 to 8 mols of an alkylene oxide or lactone per mol of erythritol to form a polyol containing four functional groups, and reacting said polyol and a di-isocyanate in a mixture giving an equivalent ratio of isocyanate to hydroxyl groups ranging between 3 to 20.

2. A polyurethane composition comprising a urethane prepolymer as claimed in claim 1, and a polyol.

3. A polyurethane composition comprising a urethane prepolymer as claimed in claim 1, a polyol, and a solvent.

4. A paint or coating agent comprising a polyurethane composition as claimed in claim 2 or claim 3.

5. A paint or coating agent comprising a polyurethane composition as claimed in claim 3, and a pigment.

6. An adhesive comprising a polyurethane composition as claimed in claim 2 or claim 3.

* * * * *